United States Patent [19]

Cheetham

[11] 4,166,555
[45] Sep. 4, 1979

[54] POCKET-SIZE DISPENSER FOR POWDER

[75] Inventor: Colin Cheetham, Hoddesdon, England

[73] Assignee: Clik-A-Sweet Limited, London, England

[21] Appl. No.: 843,649

[22] Filed: Oct. 19, 1977

[30] Foreign Application Priority Data

Oct. 29, 1976 [GB] United Kingdom ............... 45109/76

[51] Int. Cl.² ........................................... G01F 11/18
[52] U.S. Cl. .................................... 222/365; 206/537
[58] Field of Search ............... 222/365, 361, 366, 476; 221/263, 266; 206/537; 401/109, 110, 112; 73/425.6, 425.4 P

[56] References Cited

U.S. PATENT DOCUMENTS

| | | | |
|---|---|---|---|
| 3,225,745 | 12/1965 | Hechtle | 401/112 |
| 3,675,492 | 7/1972 | Tejera | 73/425.6 |
| 3,762,539 | 10/1973 | Kerr | 206/537 |
| 3,823,853 | 7/1974 | Alden | 222/365 |
| 3,855,867 | 12/1974 | Roach | 73/425.6 |

FOREIGN PATENT DOCUMENTS 1133137  11/1968  United Kingdom ..................... 222/365

Primary Examiner—Robert J. Spar
Assistant Examiner—Edward M. Wacyra
Attorney, Agent, or Firm—James C. Wray

[57] ABSTRACT

A dispenser for particulate materials comprising a housing at least a part of which defines a chamber for material to be dispensed, a dispensing orifice and a plunger and stem for controlling the operation of the valve member, the plunger being formed to snap-engage to the housing to resist removal therefrom. The plunger includes ears having bosses engaged in slots in the housing and defines end limits for movement of the valve member.

8 Claims, 5 Drawing Figures

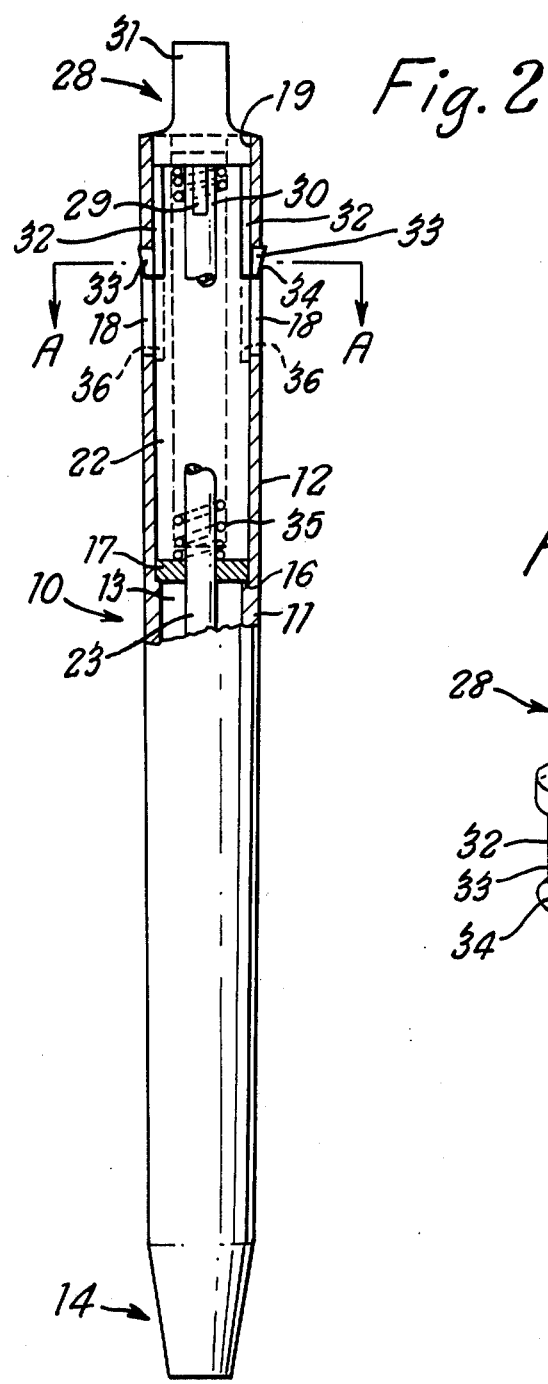
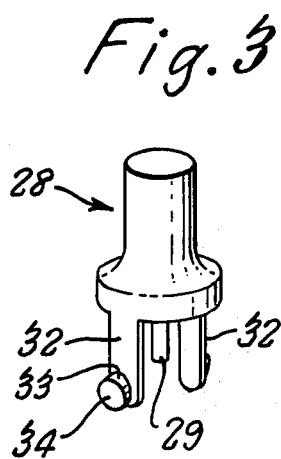

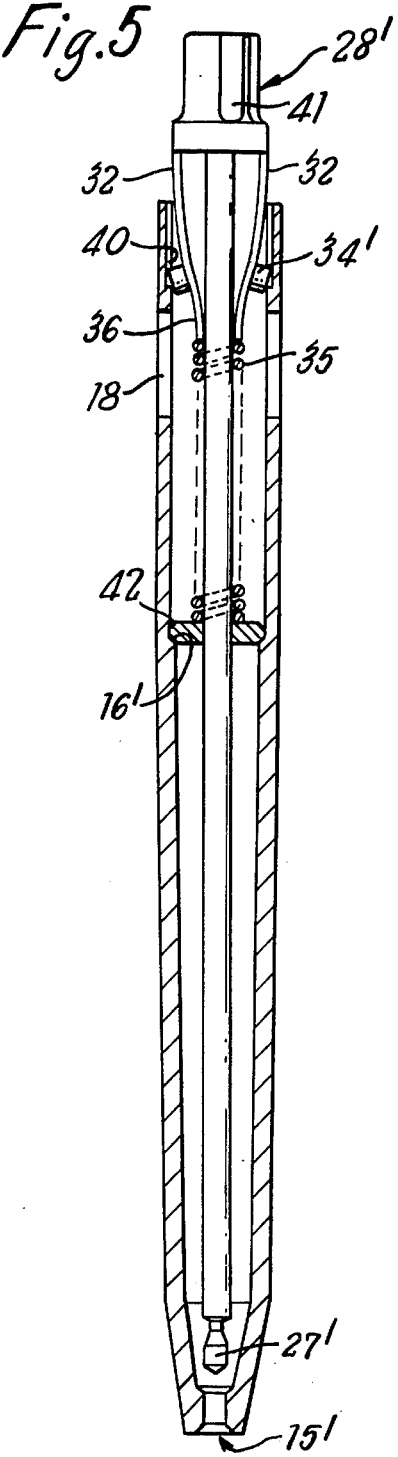
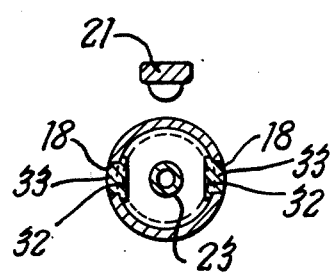

POCKET-SIZE DISPENSER FOR POWDER

This invention relates to a dispenser which is particularly useful for dispensing material such as powdered or granular saccharin or other sweetening material, although the dispenser may be used to dispense other materials, for example, salt or pepper.

Dispensers are known, e.g. as described in U.S. Pat. No. 3,064,858 and British Pat. No. 1,133,137 which include a housing at least a part of which defines a chamber for material to be dispensed, a dispensing orifice in the housing through which material in the chamber can be dispensed, a valve member which is movable to dispense a predetermined aliquot of material through the dispensing orifice and manually operable means for controlling the operation of the valve member.

Such members are in general formed from plastics mouldings which are assembled together into a structure resembling a ballpoint pen. The housing is normally divided into a lower section which defines the chamber for the material and an upper section which houses a spring for a manually operable plunger, the plunger in turn acting upon a rod which constitutes the valve member and which extends through the material in the chamber.

In order for such devices to be commercially successful it is necessary for them to be as cheap as possible. This is especially the case if the dispenser is to be disposed of once the reservoir of powder in the chamber has been finished. The known constructions suffer from the disadvantages that they require a number of different mouldings to be assembled together, e.g. by means of screw fittings or friction joints. Friction joints are undesirable in that the reservoir chamber can be inadvertently opened. The same disadvantage is also true of screw fittings, where the chamber is made in two parts to allow filling and these screw fittings are expensive to manufacture.

The invention is aimed at devising a form of structure for such a dispenser which is cheap and safe. In the preferred forms of dispenser to be described, the construction is sufficiently cheap that the dispenser can be discarded after the reservoir of powder is finished. At the same time the form of construction is such that a child cannot inadvertently open the reservoir chamber. However the re-plenishment of the reservoir chamber is possible by an adult if this is desired.

According to the invention there is provided a dispenser of the type described above which is characterised in that said manually operable means for controlling the operation of the valve member is formed to snap-engage to said housing to resist removal therefrom.

This form of construction allows the parts normally constituting the housing and composed of plastics material to be confined to a main housing section, the manually operable means or plunger, and a partition defining the end of the reservoir chamber.

Furthermore, in accordance with an important feature of the invention, the snap-engagement means may be utilized to define the end limits of movement of the valve member.

The manually operable member comprises a plunger connected to the valve member and reciprocable to open and close the dispensing orifice, the dispenser including resilient means for biasing the valve member normally to a closed position.

The plunger or other manually operable means has at least one boss which snap-engages a slot in the housing, said boss and slot forming the snap-engagement between the plunger and the housing, the ends of the slot defining the limits of said reciprocable movement.

The boss is carried by a resilient ear forming part of the plunger.

Conveniently the plunger has a plurality of generally symmetrically disposed resilient ears, each ear carrying a boss which snap-engages within a respective slot in the housing. Two slots are preferably provided on opposite sides of the housing. The boss or bosses preferably have outer surfaces tapered towards the axis of the housing to assist assembly of the plunger within the housing.

It will be appreciated that the material within the chamber can be in the form of small tablets as well as in the form of powder of granules.

Particularly when the material to be dispensed is in powdered or granular form the valve member conveniently comprises an end portion movable through the dispensing orifice, the portion having a dispensing recess which is movable from a position within the chamber containing material to be dispensed to a position outside the chamber. Thus, movement of the plunger will move the dispensing recess from a position within the chamber to a position outside the housing in which the material to be dispensed falls out of the dispensing recess.

The dispensing recess may be of any form, such as an annular groove, or a slot extending through the valve means but is conveniently defined by an annular wall situated in a plane at right angles to the direction of movement of the valve means and an inclined downstream surface, the inclined surface ensuring that during operation the material falls freely out of the dispensing recesss.

The valve member is preferably integral with an elongate member such as a rod which may be made integrally with the plunger as a one-piece moulding.

The housing is divided into two chambers, one chamber being the reservoir chamber for material to be dispensed and the other chamber containing the plunger and biasing means. The elongate member extends substantially through the two chambers which are conveniently divided by an intermediate partition wall which slidingly engages the elongate member. The other chamber preferably has a cylindrical inner surface, the plunger having a skirt which is a sliding fit in the chamber.

The dispenser may be made of any suitable material such as metal or a plastics material. If a plastics material is used the components may be injection moulded or made by any other suitable technique.

The dispenser is preferably small enough to be carried around by the user, ready for use, and for this purpose, the dispenser may include a clip to enable the dispenser to be clipped to the user's pocket in the same manner as a pen. Alternatively of course, the dispenser may be free standing so as to enable it to be placed, for example, on a table with other condiments.

A preferred embodiment of the invention, together with a modification will now be described by way of example with reference to the accompanying drawings, of which:

FIG. 2 is a view of the dispenser shown in FIG. 1 turned through 90°, partly in section, and incorporating some modifications;

FIG. 3 is a perspective view of a plunger forming part of the dispenser shown in FIGS. 1 and 2;

FIG. 4 is a section on the line A—A of FIG. 2; and

FIG. 5 is a sectional view, similar to FIG. 2 showing a further modified dispenser in position for filling during assembly.

Figure 1:
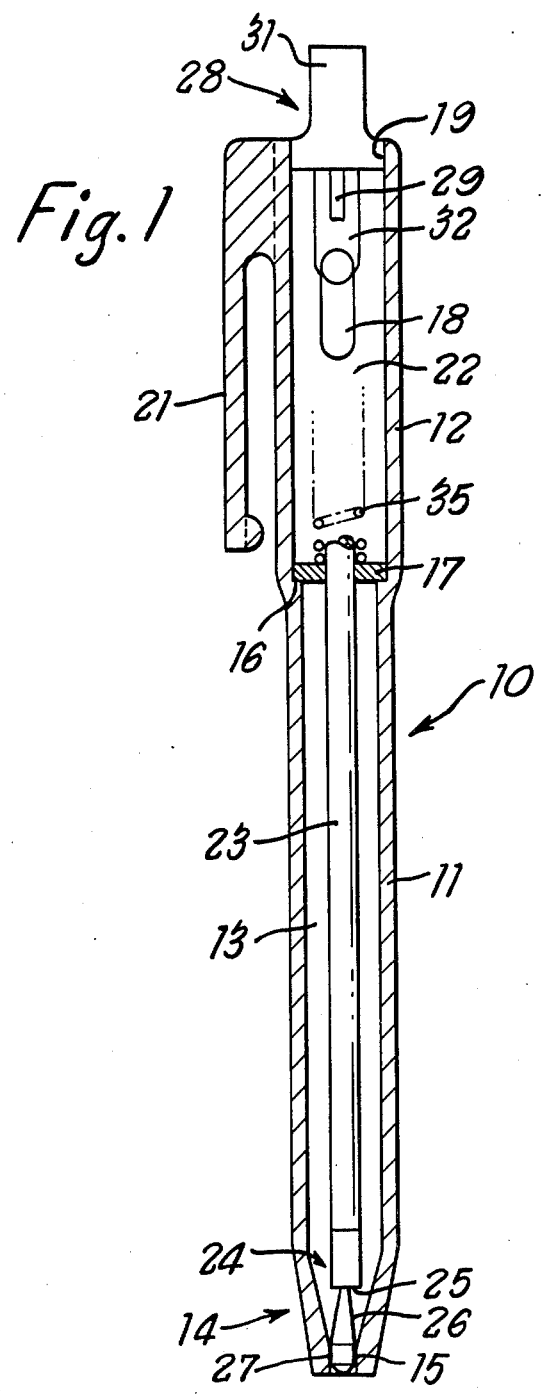
FIG. 1 is a longitudinal section through a dispenser.

The dispenser shown in FIGS. 1 to 5 has an injection moulded housing indicated generally by the reference numeral 10. The housing has a lower portion 11 and an upper portion 12; in FIG. 1 the portion 11 has a smaller diameter than the portion 12 while in FIG. 2 the two portions have identical outer diameters. The lower portion 11 defines a reservoir chamber 13 for powdered saccharin or other sweetening material. The lower end of the portion 11 is tapered to form a tip 14 having a cylindrical passage 15 defining a dispensing orifice.

At the point where the portion 11 meets the portion 12 an upwardly facing shoulder 16 is formed which receives an annular washer 17 which divides the housing 10 into two separate chambers and confines the saccharin to the chamber 13.

The portion 12 is provided with two opposed, axially extending slots 18 in its circumferential wall and has an open end 19. Integrally formed with the end 19 of the portion 12 is a clip 21 which enables the dispenser to be clipped onto a pocket in the same way as a pen.

Extending axially through the chamber 22 defined by the portion 12, and the chamber 13 defined by the portion 11 is a dispensing rod 23. The rod 23 may be in the form of a hollow tube and may be connected at its lower end to a separate valve member indicated generally by reference numeral 24.

The valve member 24 may, for example, be welded, friction fitted, or screw threaded to the rod or tube 23 and the two together may be considered to be a "valve member". An integral member may be used for the rod and valve member. In fact it is preferred to mould the rod and valve member, together with a plunger 28, as a single moulding. The valve member 24 has an end portion provided with a downwardly facing annular shoulder 25 extending at right angles to the longitudinal axis of the dispensing rod 23, and a tapered surface 26 extending outwardly in the axial direction from the shoulder 25. The shoulder 25 and the surface 26 define an annular dispensing recess. The surface 26 leads into a cylindrical portion 27 which is in sliding fit within the passage 15.

The end of the dispensing rod 23 remote from the valve member 24 is attached to a plunger indicated generally by reference numeral 28. The plunger is provided with a downwardly extending cylindrical stub 29 which frictionally engages within the open end 30 of the rod 23 as can be clearly seen from FIG. 2. The plunger 28 has an operating portion 31 which extends outwardly of the portion 12 of the housing. Extending from the under surface of the plunger 28 are two ears 32, each carrying a tapered boss 33. The plunger 28 can be inserted into the end 19 of the housing as the ears 32 are resilient and the tapered surfaces 34 of the bosses engage the inner surface of the portion 12 and are moved towards one another until the bosses snap outwardly into the respective slots 18.

A compression spring 35 is situated in the chamber 22 around the rod 23; one end of the spring abuts the upper surface of the washer 17 while the other end abuts the under side of the plunger 28.

The dispenser is filled with saccharin during the assembly of the dispenser. The rod 23, valve member 24 and plunger are attached to one another, the spring and washer passed over the rod and partially inserted into the housing. The face of the spring causes the washer to abut the shoulder 16 and thus close the upper end of the chamber 13 even though the plunger is not fully within the housing. The chamber 13 is filled through the passage 15 completely or with a measured quantity of saccharin. The plunger is then pushed into the housing until the bosses 33 snap-engage within the slots 18. The rod and valve member are then in the position shown in FIG. 1 and the dispenser is ready for use.

In order to dispense a measured quantity of saccharin, the dispenser is held vertically with the dispensing orifice 15 over a cup or other article into which the saccharin is to be dispensed. The plunger 28 is pressed downwardly against the force of the spring 35, until the bosses 33 engage the lower end of the slots 18. This moves the rod 23 downwardly and the valve member moves out of the orifice 15 carrying with it the measured volume of powdered saccharin situated within the recess defined by the shoulder 25 and the tapered surface 26. In this dispensing position, the shoulder 25 may abut the tapered inner surface of the housing at or near the passage 15 or, if desired, the cylindrical surface above the shoulder 25 may also be a sliding fit within the passage 15, closing the passage. The inclination of the surface 26 enables the saccharin to fall freely out of the recess. Pressure on the plunger is then released and the spring 35 urges the plunger upwardly to draw the valve member 24 into the chamber 13. Powder in the chamber 13 then refills the dispensing recess ready for the next dispensing operation.

In order to prevent foreign matter, which might interfere with the operation of the mechanism, entering the chamber 22 through the slots 18, the ears 32 may be provided with extensions 36 beyond the bosses 33. These extensions 36 are indicated in dotted lines in FIG. 2 and it can be seen that when the valve member 24 is in the position shown in FIGS. 1 and 2, the extensions 36 cover the slots 18 and thus prevent the entry of foreign matter. The extensions 36 will not interfere with the operation of the mechanism, but serve an additional purpose in the modified dispenser of FIG. 5.

One of the great difficulties in designing a dispenser lies in the filling of the dispenser. In the modification of FIG. 5, this operation is greatly facilitated. The ear extensions 36, shown in dotted lines in FIG. 2 are shown in full lines in FIG. 5. There may be provided a pair of grooves 40 aligned with the slots 18 respectively extending from the open end of the housing to a position short of the upper ends of the slots 18. The grooves 40 act as a convenient means for an operator to locate the position of insertion of the plunger unit (which is preferably an integral unit consisting of the plunger, the rod and a valve member) so that the bosses 34' are in a position to snap easily into place into the slots 18. A more preferable form of locating means in the case of automatic assembly is a pair of generally semi-cylindrical grooves 41 formed at diametrically opposite locations in the sides of the plunger 28'. These are adapted for engagement with a pair of spigots in an assembling machine. When the parts are assembled, the spring 35 is positioned so that it does not lie between the rod and the ears 32 but at a lower position so that when the ears 32 are compressed either by machine or by hand to allow the bosses to fit within the grooves 40, the ends of the ear extensions 36 are pressed inwards and abut or substantially abut the rod 23. The spring is then compressed against the washer 17 by the ends of the ear extensions 36 as shown. In this position the plunger unit is a moderately tight frictional fit within the housing, there being sufficient friction to prevent the spring retracting the unit as it enters. With manual assembly, the operator pushes in the unit until a resistance is felt, when the bosses 34' engage the ends of the grooves 40. The operator then knows that the unit is ready to be filled and the assembly completed. In the case of machine assembly the grooves 40 may be omitted since the machine is orientated by means of the grooves 41 and e.g. the clip 21 and movement to the filling position is readily controllable. In this position the cylindrical portion 27 of the valve member is within the chamber 13, clear of the dispensing passage 15. The dispenser can thus be safely inverted and filled, preferably with the level of powder not higher than the end of the valve member. When the dispenser is full, a final push can be given to the plunger unit to force the bosses over the remaining abutment between the grooves 40 and the slots 18, into the slots 18. This automatically releases the spring into its normal position shown in FIG. 2 where it lies between the rod and the ears 32.

In the position above described, with the spring between the rod and the ears, it is preferred that there is insufficient space between the spring and the interior walls of the housing to allow the bosses 34' to be compressed to allow removal of the plunger unit. This provides an additional safety feature. However if it is desired that the dispenser be re-useable, sufficient space may be left to allow the bosses 34' to be pressed in e.g. with a screwdriver or small tool. The plunger could then be withdrawn to the filling position shown in FIG. 5, for refilling.

In the embodiment of FIG. 5, the tapering of the bosses 34' is not employed. Also the washer 17' is formed with chamfered shoulders 42 which mate with a frustoconical shoulder 16'. This assists greatly in centering the washer and avoiding leakage of powder. The washer 17' is symmetrical so that it can be inserted either way up. The valve means 15', 27' is also of modified shape.

It will be appreciated that various modifications may be made to the embodiment described. For example the plunger 28 need not be at the top of the housing. A separate cap could be used, one of the bosses being extended to serve as a manual operating means. In a further modification the slots 18 may be grooves in the interior surface of the housing. This would allow the ear extensions 36 to be dispensed with, otherwise than in the modification of FIG. 5. However it is in fact exceedingly difficult to mould the housing with such grooves, since a single withdrawable core member for the mould could not be used. Similarly, while a single ear with a boss could be used instead of a plurality of symmetrically disposed bosses, it is preferred to use the latter since they provide a balanced sliding fit, and more importantly, they make the inadvertent withdrawal of the plunger unit significantly more difficult. For similar reasons it is preferred that the bosses do not project beyond the exterior surface of the housing.

It is convenient if at least the lower portion 11 of the housing is made of a transparent or translucent material so that the user can see the level of saccharin in the dispenser. It is possible for the entire pen to be made of the same transparent or translucent material such as polystyrene or acetal co-polymer but preferably the portion 12 of the housing 10 is textured, e.g. striated on its inner surface, so as to render this portion opaque in order that the mechanism situated within the chamber 32 is not seen by the user.

What is claimed is:

1. A pocket-size dispenser for particulate material comprising:
    a one-piece molded housing having a lower bore portion terminating in a constricted dispensing orifice at a lower end of the housing,
    an upper bore portion of uniform cross-section which is larger than that of said lower bore portion and extending from a top end of said housing and connected to said lower bore portion at a shoulder,
    a centrally bored partition means at the shoulder dividing the housing into a lower chamber for storing said particulate material and an upper chamber,
    a valve member which is movable downwardly through said dispensing orifice to dispense a predetermined aliquot of said particulate material,
    a rod rigid with said valve member and extending through said upper and lower chambers and through said bore in said partition means,
    a plunger rigid with said rod,
    a button on said plunger projecting through the top of said housing,
    a skirt on said plunger slidingly fitting said upper bore portion,
    at least one resilient ear extending downwardly from said skirt,
    a boss extending radially outwardly from said resilient ear,
    said housing having a lengthwise extending rectilinear slot located to receive said boss, the length of said slot determining the extent of dispensing movement of said valve member and providing upper and lower limits of travel of said valve member, rod and plunger,
    a spring surrounding said rod and located against said partition means and said skirt between said rod and said ear to bias the plunger and valve member to an upper, closed position, and
    said ear and boss being formed so as to allow snap-engagement of the assembly of said plunger, said spring, said rod and said valve member into said housing from the top end thereof,
    said dispenser comprising at least two of said bosses and at least two of said slots generally symmetrically disposed about the axis of said housing.

2. A dispenser according to claim 1, wherein said valve member comprises an end portion movable through said dispensing orifice, said end portion having a dispensing recess which is movable from a position within said chamber containing material to be dispensed to a position outside said chamber.

3. A dispenser according to claim 1, wherein said dispensing recess is defined by an annular wall situated in a plane at right angles to the direction of movement of said valve means and having an inclined downstream surface.

4. A dispenser according to claim 1, wherein each said ear has an extension portion extending beyond said boss sufficiently to cover said slot in the normal closed position of said plunger.

5. The dispenser according to claim 1, wherein the interior surface of said housing includes at least two grooves wherein each groove is aligned with a respective boss and slot, said groove extending from the end of said housing to a position spaced from said respective slot by a distance such that when said respective boss abuts the end of said groove, said valve member is clear of said dispensing orifice to allow the dispenser to be filled with said material.

6. A dispenser according to claim 1, wherein each said ear has an extension portion extending beyond a respective boss sufficiently to cover a respective slot in the normal closed position of the plunger, and wherein the interior surface of said housing includes at least two grooves wherein each groove is aligned with a respective boss and slot, said groove extending from the end of said housing to a position spaced from said respective slot by a distance such that when said respective boss abuts the end of said groove, said valve member is clear of said dispensing orifice to allow the dispenser to be filled with said material, and wherein the dimensions are such that when each respective boss is in each respective groove, the end of said extension portion abuts said spring, said spring being released when each respective boss engages in each respective slot to a normal position between the ears and said rod connecting the plunger to said valve member.

7. A dispenser according to claim 6, wherein when said spring is in the said normal position, said respective bosses are prevented by said springs from retracting sufficiently to allow removal of said plunger.

8. A dispenser according to claim 1, wherein said plunger rod and valve member are formed as a one-piece molding.

* * * * *